United States Patent
Seeger et al.

(10) Patent No.: US 7,308,018 B2
(45) Date of Patent: Dec. 11, 2007

(54) METHOD FOR OPERATING A DIGITAL MOBILE RADIO NETWORK WITH SPACE-TIME BLOCK CODES

(75) Inventors: Alexander Seeger, Feldkirchen (DE); Ulrich Vogl, Ebermannsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 836 days.

(21) Appl. No.: 10/473,468

(22) PCT Filed: Mar. 4, 2002

(86) PCT No.: PCT/EP02/02330

§ 371 (c)(1),
(2), (4) Date: Sep. 29, 2003

(87) PCT Pub. No.: WO02/080437

PCT Pub. Date: Oct. 10, 2002

(65) Prior Publication Data

US 2004/0179467 A1 Sep. 16, 2004

(30) Foreign Application Priority Data

Mar. 28, 2001 (DE) .................. 101 15 261
Mar. 28, 2001 (EP) .................. 01107920

(51) Int. Cl.
*H04L 27/30* (2006.01)

(52) U.S. Cl. .................. 375/141; 375/146; 375/267; 375/199; 370/204; 370/320; 370/441; 370/479

(58) Field of Classification Search .................. 375/130, 375/140, 141, 146, 267, 295, 299; 370/203, 370/204, 320, 335, 342, 441, 465, 479
See application file for complete search history.

(56) References Cited

U.S. PATENT DOCUMENTS 6,804,307 B1 * 10/2004 Popovic .................. 375/299
7,012,967 B2 * 3/2006 Hammons et al. .......... 375/267

OTHER PUBLICATIONS

Hassibi et al., "Cayley Differential Unitary Space-Time Codes", Department of Electrical Engineering, California Institute of technology, Pasadena, CA, Bell Laboratories, Lucent Technologies, Murray Hill, NJ, Feb. 27, 2001, pp. 1-44.

Popovic, "New Complex Space-Time Block Codes for Efficient Transmit Diversity", Ericsson Research, Stockholm, Sweden, IEEE 6th Int. Symp. On Spread-Spectrum Tech. & Appli., NJIT, NJ, USA, Sep. 6-8, 2000, pp. 132-136.

3GPP TS 25.211 V3.4.0 (Sep. 2000), Technical Specification, 3rd Generation Partnership Project, Technical Specification Group Radio Access Network, Physical Channels and Mapping of Transport Channels onto Physical Channels (FDD), Released 1999, pp. 1-43.

(Continued)

*Primary Examiner*—Dac V. Ha
(74) *Attorney, Agent, or Firm*—Staas & Halsey LLP

(57) ABSTRACT

The invention relates to the preparation and numerical optimization of non-linear space-time block codes for application in a digital mobile radio system, with a maximum transmission diversity for "Rate 1," transmission systems in the case of two or more transmitter antennae and with complex symbols.

11 Claims, 10 Drawing Sheets

OTHER PUBLICATIONS

Tarokh et al., "Space-Time Codes for High Data Rate Wireless Communication: Performance Criterion and Code Construction", IEEE Transactions on Information Theory, vol. 44, No. 2, Mar. 1998, pp. 744-765.

Tarokh et al., "Space-Time Block Codes from Orthogonal Designs", IEEE Transactions on Information Theory, vol. 45, No. 5, Jul. 1999, pp. 1456-1467.

Simon, "Representations of Finite and Compact Groups", 1996, Graduate Studies in Mathematics, American Mathematical Society, pp. 136-145.

Tirkkonen et al., "Complex Space-Time Block Codes for Four Tx Antennas", Nokia Research Center, Nokia Group, Finland, 2000.

* cited by examiner

FIG 3A

Non-linear ST block code for n=3 transmitter antennas and BPSK modulation (symbol length l=n=3) with the $2^3$ = 8 possible bit vectors (0,0,0); (0,0,1); (0,1,0); (1,1,1); (1,0,1); (1,0,0) of which 8 code words C(:,:,k) are associated with one-to-one correspondence with k=1, ..., 8 (unitary 3x3 matrices with complex matrix elements with a real component and an imaginary component)

Last index (k): number of code word

First index (line i): respective transmitter antenna

Second index (column j time slot (three time slots with three antennas))

i is the imaginary unit

FIG 3B

```
Bit vector    Symbol word 1
(0,0,0)  ->  C(:,:,1) = 0     +0.4856 -0.6930i    +0.4701    -0.1224i    0
                      0       -0.0645 +0.1553i    +0.1240    -0.4898i    0
                              +0.4372 +0.2541i    -0.1146    -0.7039i    1

(0,0,1)  ->  C(:,:,2) =       +0.0000 -0.4794i    -0.6025    -0.5061i    -0.1182 -0.3701i
                              +0.6025 -0.5061i    -0.0000    -0.1895i    -0.3134 +0.4966i
                              +0.1182 -0.3701i    +0.3134    -0.4966i    +0.0000 -0.7101i (0,1,1)  ->  C(:,:,3) =       -0.4856 -0.2547i    -0.2395    -0.3167i    -0.7322 -0.0746i
                              -0.1662 -0.5944i    -0.1244    -0.3972i    +0.5656 +0.3549i
                              +0.4875 -0.2841i    -0.7704    +0.2750i    -0.0971 -0.0552i (0,1,0)  ->  C(:,:,4) =       -0.6868 -0.2309i    -0.3890    +0.4491i    +0.2575 +0.2361i
                              -0.1846 +0.0563i    -0.1759    +0.2728i    -0.8527 -0.3608i
                              -0.6035 -0.2713i    +0.5631    -0.4738i    -0.1373 -0.0419i (1,1,0)  ->  C(:,:,5) =       -0.4856 +0.5282i    -0.0850    +0.6697i    -0.1344 -0.1066i
                              -0.3206 +0.3920i    -0.1244    -0.5620i    -0.4128 +0.4918i
                              -0.1103 -0.4654i    +0.2080    +0.4119i    -0.0971 +0.7409i (1,1,1)  ->  C(:,:,6) =       +0.0000 +0.6442i    +0.2175    -0.0412i    +0.4451 +0.5913i
                              -0.2175 -0.0412i    +0.0000    +0.8623i    +0.4068 -0.2047i
                              -0.4451 +0.5813i    -0.4068    -0.2047i    +0.0000 -0.5065i (1,0,1)  ->  C(:,:,7) =       +0.1724 +0.4856i    +0.6285    -0.1324i    +0.4747 -0.3107i
                              +0.3508 +0.5381i    -0.6996    +0.1244i    +0.2871 +0.0060i
                              +0.1160 +0.5554i    +0.2072    +0.1988i    -0.7656 +0.0971i (1,0,0)  ->  C(:,:,8)
```

3 antennas (BPSK)

L-1 code intervals (minimum eigenvalue standard)

and bit mapping (Gray code)

------- $d_{ij}=0.765$

——— $d_{jj}$ sqrt(2) (only intervals in respect of C1 are shown.

All other combinations of non-immediate neighbors are also included with the square root of 2).

BPSK simulation for 2 and 3 antennas using an $L_{min}$ code

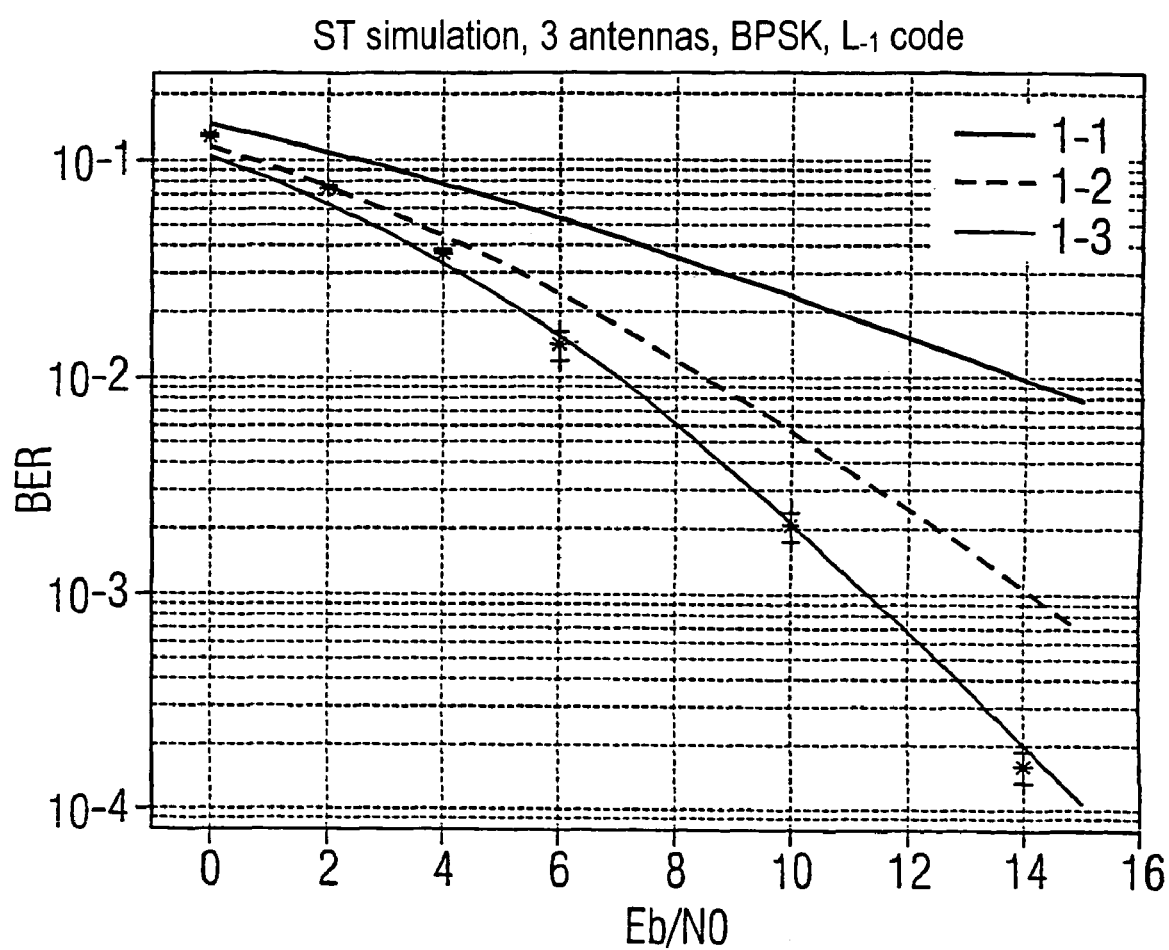

physical channels (FDD) (1999 edition), September 2000). This known space-time block code scheme satisfies the "rate 1" requirement.

A "rate 1" space-time block code scheme can be described as a system, in which, for each time interval considered, precisely the same number of data bits can be sent through effectively from a transmitter to a receiver as with the reference system shown in FIG. 1 with only one transmitter and one receiver antenna. In other words, a "rate 1" ST code has the same transmission rate compared with a basic system with only one transmitter and one receiver antenna. This is for example a system in which a block of two code words is transmitted to the receiver at the same time in two successive time windows via two different transmission channels; the receiver thereby receives precisely the same amount of information per unit of time as if two corresponding individual bits had been transmitted in two successive time windows via a single transmission channel. Provision is therefore made in the W-CDMA mode of the UMTS standard for future mobile radio systems (see for example www.3GPP.org) to transmit the standard mapping of four bits onto $2^4=16$ ST symbols in two time stages via two transmitter antennas. A "rate 1" system for external blocks therefore behaves in exactly the same way as the basic system with only one transmitter and one receiver antenna. This characteristic is decisive when upgrading a basic system to a system with a plurality of transmitter antennas and space-time block codes.

The space-time block code used in W-CDMA mode corresponds to what is known as the Alamouti code. This is a code that is very simple to reconstruct on the receiver side to increase diversity in a digital mobile radio network with a transmitting station with two (n=2) transmitter antennas. The Alamouti code is for example disclosed in "A simple Transmitter Diversity Scheme for Wireless Communications", IEEE J. Select Areas Commun, vol. 16, pages 1451-1458, October 1998 by S. M. Alamouti or in the two publications by V. Tarokh referred to above.

In order to increase diversity in a mobile radio network further in the future both in the uplink direction (from a mobile station to a base station) and in the downlink direction (from a base station to a mobile station), the number of antennas per sector of a base station should be greater than two. It is therefore clear that space-time codes are required, which can be used in the case of three, four or more transmitter antennas. An increase in diversity with the same transmission power results in an increase in receiving quality. Or, looked at another way, an increase in diversity with the same receiving quality means a reduction in transmission power. The transmission power then not used up in a transmitter can in turn be used to supply more users.

The performance of a space-time block code is also influenced by the intervals between the code words. Observations on this are contained in the two articles by V. Tarokh referred to above.

In the transmission shown diagrammatically in FIG. 2 the matrix shown with the elements $c_{ijk}$ corresponds to a code word with the number k. The "interval" between code words, i.e. the "interval" between two matrices $C_{k1}$ and $C_{k2}$ is ultimately a measure of the quality of a transmission code, i.e., the likelihood with which the originally transmitted code words can be reconstructed as uniquely as possible from a sequence of code words received at the receiver with distortion due to the transmission path. In this respect the known space-time blocks in the case of two transmitter antennas can be further improved.

In the case of three, four or more antennas (n>2) it is shown in "Space-time Block Codes from Orthogonal Designs", IEEE Transactions on Information Theory, vol. 45, No. 5, July 1999, pages 1456-1467 by V. Tarokh et al. that linear codes with "rate 1" and complex symbols cannot exist.

In a presentation given at Globecom 2000 in December 2000 on "Complex Space-Time Block Codes for Four Tx Antennas" by Olav Tirkkonen and Ari Hottinen, the case of n=4 transmitter antennas was examined and complex space-time block codes specified with a rate of ¾.

The search for space-time codes, in particular for a number n>2 of transmitter antennas, has therefore taken two directions:

1. In "Space-time Block Codes from Orthogonal Designs", IEEE Transactions on Information Theory, vol. 45, No. 5, July 1999, pages 1456-1467 by V. Tarokh et al., linear space-time codes with a rate less than 1 are constructed for more than two transmitter antennas. Here the space-time symbols are linear combinations of the original signals. These constructions are not available for external coding, because they do not have the "rate 1" characteristic. This means that they cannot be integrated as simple additional features in an existing mobile radio system without space-time coding.

2. Space-time trellis codes are constructed by combining space-time codes with external error correction codes. Combining space-time mapping with external coding however makes it impossible to integrate space-time codes as a simple additional feature in an existing system. Also in such a case proven external coding techniques such as turbocodes (see C. Berron, A. Glavieux and P. Thitimajshima: Near Shannon limit error correcting codes and decoding: turbo codes" in Proc. IEEE ICC, Geneva, May 1993, pages 1064-1070)) or trellis codes must be modified.

This reveals a problem in that the digital code words to be transmitted between the transmitting and receiving stations in a digital mobile radio network should be optimized in the case of two or more transmitter antennas with regard to the following:

1. There should be a "rate 1" code if possible.

This is a mandatory requirement in order to be able to upgrade mobile radio networks already commercially available with the lowest possible upgrade costs for the use of the new space-time block codes. When "rate 1" is used when upgrading from a known single antenna to single antenna system shown in FIG. 1 to a multi-antenna to single antenna system as shown in FIG. 2 (or even to multi-antenna to multi-antenna systems), the assemblies (not shown in FIGS. 1 and 2) required on the transmitter side to generate the bit vector to be fed in and the assemblies (also not shown) required on the receiver side to further process the reconstructed bit vectors output by the receiver unit do not have to be changed. "Rate 1" codes thus guarantee "downward compatibility" of digital mobile radio stations operated with multi-antenna units and corresponding space-time block codes with other already existing system components, thereby eliminating a significant obstacle to investment impeding the practical introduction of "rate≠1" systems, as with these the assemblies for transmitter-side bit vector generation and for receiver-side bit vector reconstruction must also be changed.

The introduction of "rate 1" space-time blocks means that it is also possible to leave the other parameters of a transmitter code scheme (such as channel coding, interleaving, service multiplexing, etc.) unchanged.

2. The code should be simple to construct on the transmitter side and simple to reconstruct on the receiver side.

3. The code words should have the "biggest interval" possible between them. This means that a set of code words should be structured so that from the signals received on the receiver side with noise and/or distortion, each of which comprises the original signal transmitted on the transmitter side times a "fading factor" describing the fading of intensity associated with increasing distance plus noise (thermal noise at the input amplifier of the receiver plus interference noise due to disruptive signals from other users of the mobile radio network), the original signal can be reconstructed even with a relatively high level of interference in the most error-free possible manner as the signals transmitted on the transmitter side (i.e. without confusion between individual code words).

4. The space-time block code used should maximize diversity, i.e., for two transmitter antennas the theoretically maximum degree of diversity 2 should be achieved if possible, for three transmitter antennas the theoretically maximum degree of diversity 3, etc.

5. The space-time block code used should allow complex transmission symbols, in order for example that it can be used with UMTS where QPSK (quadrature phase shift keying) modulation is used. Complex symbols also allow 8-PSK (8-phase shift keying) or M-QAM (M-fold quadrature amplitude modulation).

SUMMARY OF THE INVENTION

One of the potential objects of the present invention is to optimize the known methods for operating a digital mobile radio network as far as possible by using alternative space-time block codes in respect of the above criteria 1 to 5. In particular "rate 1" space-time block codes with maximum transmission diversity should be prepared in the case of three or more transmitter antennas (n>2). Space-time block codes with interval optimization should also be prepared in particular in the case n≧2.

According to one aspect of the invention, space-time block codes can be constructed from unitary n×n matrices.

In particular in the case of n>2, i.e., three and more transmitter antennas, it is demonstrated that space-time block codes for mobile radio systems with n transmitter antennas and m receiver antennas with a complex ST modulation scheme and with the degree of diversity n×m and "rate 1" essentially exist, as they can be constructed from unitary n×n matrices.

Further embodiments relate to operating a digital mobile radio network with orthogonally structured space-time block transmission codes with maximum diversity. In the case of two or more (n≧2) transmitter antennas, optimized space-time block codes with a complex ST modulation scheme with the degree of diversity n×m and "rate 1" are determined numerically, with which the code symbols have the greatest possible "interval" in the sense of a metric specified in each instance.

Further embodiments pertaining to the matter relate to base and mobile stations in a digital mobile radio network in which reference tables, which contain the matrix elements of code words used in the methods, are stored as well as computer program products in which corresponding reference tables are implemented.

According to the applicant's proposal, measures are specified in particular for the construction of "rate 1" space-time block codes for three, four or more antennas, with which a maximum diversity amplification is achieved.

This is considered to be a significant theoretical and practical breakthrough and is based on two changes compared with the procedures known from the related art:

1. Non-linear codes are used. This does not represent a problem, as the number of code words in space-time blocks is $2^n$ for BPSK (binary phase shift keying); digital frequency modulation technique for sending data via a coaxial cable network: this type of modulation is less efficient but also less subject to noise than similar modulation techniques, such as for example QPSK (quadrature phase shift keying) and $4^n$ for QPSK modulation. In other words, even for n=4, when a QPSK modulation is used, only 256 code words are used and these can be stored easily in a table.

2. Neither the transmitted energy per antenna and time unit nor the energy conveyed via all the antennas at a predetermined time is kept constant. This is not critical with W-CDMA in particular, as greater fluctuations can also occur in the emitted energy in a standard system due to the superimposition of different user signals. The additional fluctuations in power, introduced by the use of new space-time codes, are negligible in comparison.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 shows in table form a specific example of a BPSK-compliant coding of eight bit vectors into the matrix elements of eight complex unitary matrices (ST symbols), which are used as the basis for a space-time block coding during the implementation of a method according to one aspect of the invention for n=3 transmitter antennas;

FIG. 10 shows a BPSK simulation for n=3 transmitter antennas using an $L_{-1}$ code.

DETAILED DESCRIPTION OF THE PREFERRED EMBODIMENT

Figure 1:
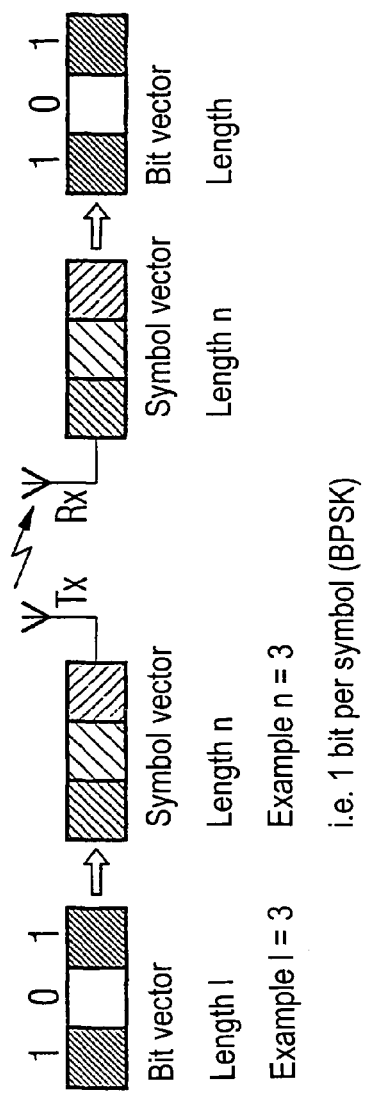
FIG. 1 shows a diagrammatic illustration of a radio transmission link and a corresponding symbol vector coding and decoding for a known single antenna to single antenna arrangement in a digital mobile radio network.

Reference will now be made in detail to the preferred embodiments of the present invention, examples of which are illustrated in the accompanying drawings, wherein like reference numerals refer to like elements throughout.

To give a better understanding, constructive proof is first provided to show that complex space-time block codes with maximum diversity exist not only for the case n=2 transmitter antennas (as shown for example by the known Alamouti scheme) but that complex space-time block codes with maximum diversity also exist for the case with n>2 transmitter antennas.

The mathematical structure is relatively complicated. In practice however, the method can be reduced to the use of a reference table for space-time code words, which are stored in the receiver and transmitter. FIG. 3 shows an example of such a reference table. Its structure and method of use are explained in more detail below. These tables can then be used without a deeper knowledge of their without a deeper knowledge of their derivation being required.

The mathematical notation used in the present application is for example explained in Simon Barry, "Representation of Finite and Compact Groups", Graduate Studies in Mathematics, Volume 10, American Mathematical Society or in Bronstein, Semendjajew: "Taschenbuch der Mathematik" (Pocket Book of Mathematics), p. 155. published by Harri Deutsch, Thun and Frankfurt/Main, ISBN 3 87144 492 8.

The inventors propose a conceptually new approach is defined for space-time codes. First the transmitter units are disclosed. Next a standard multi-input-multi-output fading channel is disclosed. Finally, the process for recording space-time symbols is disclosed. On this basis, constructive proof of the existence of space-time codes with maximum diversity is given for mobile radio systems with $n \geq 2$ transmitter antennas. This proof covers cases with complex and real space-time symbols.

Although the proof of existence is constructive, it does not provide an optimum space-time code, i.e., a space-time code with optimized "intervals" between the code words. Therefore practical methods for constructing codes based on numerical optimization are defined. Finally the results are also confirmed by simulations.

Transmitter

Let us assume first that there are n transmitter antennas and one receiver antenna.

Extension to n transmitter antennas and m receiver antennas looks like this:

In the case of m>1 receiver antennas, the codes and detection methods disclosed below can be implemented separately in each instance for all the m receiver antennas. The results are then combined in what is known as a "maximum ratio combining" method. Such a "maximum ratio combining" method is for example described in J. Proakis, M. Salehi: Communication Systems Engineering, Prentice Hall, 1994, ISBN: 0-13-306625-5.

This then gives a maximum degree of diversity of n×m.

In particular the extension to m>1 receiver antennas does not influence optimization of the transmitter side. This can be identified for example from the equation (8) in Tarokh et al., "Space-Time Codes for high data wireless communication: performance criterion and code construction". Here it is shown that the likelihood of mutilation between two sequences is equal to the product of the likelihood of mutilation for only one receiver antenna in each instance and all product components are of equal size.

Accordingly, the minimization of a product component results in the minimization of the product as a whole. This means that the number of receiver antennas has no influence on the optimality of the transmission symbols.

To this extent all the transmission methods disclosed below can be used without change for any number of receiver antennas.

A space-time block coding ("block ST modulation") is described as the mapping of a total of $2^l$ different bit vectors $\vec{b} \in B^l$ (each of which comprise l bits $\in \{0,1\}$) onto a set of $2^l$ space-time symbols $C(\vec{q}) \in U(n)$, which are described as unitary n×n matrices by the mapping:

$$STM: B^l \rightarrow U(n)$$

$$\vec{b} \rightarrow C(\vec{b}) \qquad (1)$$

The modulation rate is R=1, if the l input bits are arranged in n symbols, with each symbol comprising l/n bits (e.g. l/n=1 for BPSK and l/n=2 for QPSK).

The mapping of bit vectors $\vec{b}_k$ onto the symbols transmitted in n stages via an antenna (see FIG. 1) is now replaced by the mapping of bit vectors $\vec{b}_k$ onto a set of space-time symbols ST, all of which are transmitted via n antenna in n stages. The application of these space-time codes is then without influence (transparent) for external transmission blocks, e.g. such as a channel coder.

At the transmitter the matrix element $c_{ijk}$ of the $2^l$ unitary n×n matrices $C_k$ are then processed as space-time variables as follows: if the unitary n×n matrix $C_k$ as an ST symbol corresponds to a bit vector $\vec{b}_k$ to be transmitted, a signal corresponding to the matrix element $c_{ijk}$ (with line index i=1, . . . , n, column index j=1, . . . , n) is transmitted from the ith antenna in time window j. With this set-up, the transmission time period for a complete ST symbol is then n time units.

As all matrices $C_k$ are unitary, i.e., $C_k^\dagger C_k = C_k C_k^\dagger = 1$, the lines and columns of $C_k$ are orthonormal. This implies that the power transmitted from each antenna (averaged over time) is identical. Also the total symbol energy (added together over all antennas) is constant in each time slot. It should be noted that the transmission power $E_b$ is automatically standardized and independent of n, due to the fact that the $C_k$ are unitary.

Channel Model

A fading channel with simple Rayleigh or Rician distribution is assumed below. Transmission paths (from each antenna) are subject for example to independent Rayleigh fading in each channel state $\alpha_{ij}$ and it may be assumed that the channel does not change significantly during the transmission time of an ST symbol (corresponding to n time slots). Let the signal to noise ratio in each channel be the same, i.e. $\gamma_b = E_b/N_0$.

Receiver

With the modulation and channel model described above, the receiver will receive a signal at a receiving time, which is offset due to the runtime and corresponds to the transmission time j, the signal resulting from the summation of all matrix elements $c_{ijk}$, j=const., in a matrix column (fixed transmission time j), for a specific code word $C_k$, in each instance weighted by a fading factor specific to the channel state, with noise still having to be taken into account. This means, when transmitting a code symbol $C_k$, which corresponds to a bit vector $\vec{b}_k$, that the signal (the receiving vector)

$$r_j^k = \sum_{i=1}^{n} c_{ijk} a_i + \text{noise}$$

is present on the receiver side at a receiving time, which is offset due to the runtime. In other words, the channel state characterized by a does not depend on the space-time symbol $C_k$ sent and is constant for all n time slots.

Let the index k be omitted below for reasons of clarity.

If we write the receiving vector as $\vec{r} = (r_1, \ldots, r_n)^T$ and the channel state vector as $\vec{a} = (a_1, \ldots, a_n) \in C^n$, this can be written in matrix form as:

$$\vec{r}(\vec{b}) = C(\vec{b})\vec{a} + \vec{z}, \qquad (2)$$

where $\vec{z}$ describes the noise vector distributed as standard. From the point of view of the receiver the receiving symbols $\vec{r}(\vec{b})$ are not fixed but are for their part also stochastically distributed variables (i.e. they are dependent on the channel state!). The overall modulation is therefore a mapping of the bits onto the n-dimensional complex number level:

$$B^l \rightarrow U(n) \rightarrow C^n \qquad (3)$$

$$\vec{b} \rightarrow C(\vec{b}) \rightarrow \vec{r}(\vec{b}). \qquad (4)$$

For a good code this mapping must of course be uniquely reversible, for each channel state $\vec{a} \neq 0$. This imposes basic conditions on the set of ST symbols $\{C(\vec{b})\}_{\vec{b} \in B^l}$. In fact for any two symbols $C(\vec{b}_i)$ and $C(\vec{b}_j)$, $\vec{b}_i \neq \vec{b}_j$ the Euclidean interval cannot be zero, i.e. the following must apply:

$$\|C(\vec{b}_i)\vec{a} - C(\vec{b}_j)\vec{a}\|_2 \neq 0 \qquad (5)$$

for any state vector $\vec{a}$, which is not equal to the zero vector.

The following must apply in particular:

$$[C(\vec{b}_i) - C(\vec{b}_j)] \cdot \vec{a} \neq 0$$

for all $\vec{a} \neq 0$ (zero vector).

If this condition is satisfied, a unique solution must be defined for the present linear equation system, i.e. $\det[C(\vec{b}_i) - C(\vec{b}_j)] \neq 0$, where the determinate is equal to the product of the eigenvalues of $[C(\vec{b}_i) - C(\vec{b}_j)]$.

Minimizing the equation (4) for all $\vec{a}$ on condition that $\|\vec{\alpha}\| = 1$ gives an eigenvalue equation for the matrix $C(\vec{b}_i) - C(\vec{b}_j)$.

Thus the minimum interval (determined by the "worst case" channel $\alpha$" with the greatest signal distortion) for a defined pair of ST codes is equal to the minimum eigenvalue $\lambda_{min}$ of $C(\vec{b}_i) - C(\vec{b}_j)$. $\lambda_{min}$ must be positive so that there is reversibility.

The following statements are equivalent:

The eigenvalues $\lambda_{min}$ of $C(\vec{b}_i) - C(\vec{b}_j)$ are not equal to zero for any pair of ST symbols.

For all i, j (i≠j) the rank of $C(\vec{b}_i) - C(\vec{b}_j)$ is equal to n. For all i, j (i≠j) the determinant $\det(C(\vec{b}_i) - C(\vec{b}_j))$ cannot disappear.

Given equation (2) an optimum MLD (minimum likelihood detector) minimizes the interval in respect of all possible channel symbols $\vec{r}_j = C(\vec{b}_j)\hat{a}$, where an estimated value $\hat{a}$ is used for the channel state information (e.g. by pilot sequences):

$$\hat{b} = \arg\min_j \|\vec{r} - C(\vec{b}_j)\hat{a}\|.$$

A logarithmic likelihood value ("soft symbol") can be derived for the bit vector $b$ from the interval $\|\vec{r} - C(\vec{b}_j)\hat{a}\|$. If mapping of the bits in symbols (Gray Code or similar) is specified (e.g. by pilot sequences) an LLR (log likelihood ratio) value $$\log\left(L(x) = \frac{P(b=0)}{P(b=1)}\right)$$

could also be determined for each bit.

Existence of Time-Space Symbols (ST Symbols) with Maximum Rank

The question is whether there is a set of $2^l$ ST symbols (matrices $C_k$) for every number n of antennas, with the characteristic that they have a maximum rank. In other words $$d_{min} = \min_{i \neq j} |\det(C_i - C_j)| \qquad (9)$$

has to be determined for all pairs of $C_i$, $C_j$.

In the case of unitary n×n matrices, their rank is always equal to n. The decisive question for the ST codes considered now is whether all the differences between the selected matrices have full rank (n).

If we can construct a set of matrices $C = \{C_i\}$ in such a way that they form a group in respect of standard matrix multiplication, things become simpler:

Lemma 1:

Let $C = \{C_i\}$ be a group. If $C_i = 1$ is the unit matrix of the group, then $$d_{min} = \min_{i \neq j} |\det(1 - C_j)|$$

applies.

Proof:

Due to the group characteristic, $C_i^{-1} = C_i^\dagger \in C$. This means that $C_j C_i^{-1} = C_k \in C$ and the following applies:

$$\min_{ij} |\det(C_i - C_j)| = \min_{ij} |\det(1 - C_j C_i^\dagger)| = \min_k |\det(1 - C_k)|.$$

Use is also made here of the fact that $|\det(C)| = 1$.

Example 1

The Alamouti scheme is based on $C=1\lceil 1\pm j1\pm j\rceil$ $2\lfloor -1\pm j1\mp j\rfloor$ etc.

Actually, the Alamouti scheme comprises a subset of the cube group with the order o=24. Eight of the group elements are not used, although they give the same $d_{min}=1$. In this scheme in principle therefore Id(24)>4 bits could be transmitted without data loss. (However the symbols not transmitted have a poor crest factor, e.g. C=1).

It is known from the publication "Space Time Codes for High Data Wireless Communication: Performance Criterion and Code Construction" by V. Tarokh, referred to above, that the rank n of n×n code matrices constructed as space-time block symbols is equal to the degree of diversity. It therefore also follows that the rank of the difference between two n×n code matrices is maximum n. This knowledge is used below.

Complex Symbols

Theorem 2:

For any l and $n \geq 2$ there is a complex ST modulation scheme with a degree of diversity of n.

Proof: by Specific Construction

Note that, in this case, the ST code $\{C_k(\vec{b}_k)\}_{\vec{b} \in B}^l$ comprises a subset of all possible unitary n×n matrices. On the basis of the spectral theorem set out in Simon, Barry: Representations of Finite and Compact Groups, 1996, Graduate Studies in Mathematics, American Mathematical Society, ISBN 0-8218-0453-7, every unitary matrix C can be written as:

$$C = V \begin{pmatrix} \lambda_1 & & 0 \\ & \cdots & \\ 0 & & \lambda_n \end{pmatrix} V^{-1}$$

where V is unitary and $\lambda_i = \exp(j\beta_i)$ (in the argument for the function exp, j is the imaginary unit). Let us now select $$\beta_i = \frac{2\pi}{2^l} q_i,$$

where $q_i$ is any odd whole number. Then $C^{2^l}=1$ applies and $\{C_k\}_{k=0 \ldots 2^l-1}$ is an (Abelian) group, with a generator $$C = V \begin{pmatrix} \exp\left(\frac{2\pi j}{2^l} q_1\right) & & 0 \\ & \cdots & \\ 0 & & \exp\frac{2\pi j}{2^l} q_n \end{pmatrix} V^{-1} \quad (7)$$

for any fixed V. The eigenvalues of $C_k$ are $$\lambda_i^k = \exp\left(\frac{2\pi j}{2^l} q_i^k\right).$$

Constructing with $k=0 \ldots 2^l-1$ means that they are clearly different from 1. Based on this it can be shown that $d_{min} = \min_{k \neq 0} |det(1-C_k)| \neq 0.$ As $|det(V)|=1$, $$d_{min} = \min_{k \neq 0} \left| det\left(1 - \begin{pmatrix} \lambda_1 & & 0 \\ & \cdots & \\ 0 & & \lambda_n \end{pmatrix}^k \right) \right| = \min_{k \neq 0} \left| \prod_{i=1}^n (1-\lambda_i^k) \right| \neq 0$$

Note that the key to the above proof is based on the fact that it is always possible to construct a set of unitary matrices, the eigenvalues of which are all different from 1.

Equation (7) therefore provides the basis for a method for constructing complex unitary n×n code matrices $C_k$, which can be used as symbol words for space-time block codes for any number of $n \geq 2$ transmitter antennas, with the space-time block codes providing a maximum diversity n, as the rank of the complex unitary n×n code matrices $C_k$ is equal to n.

Figure 2:
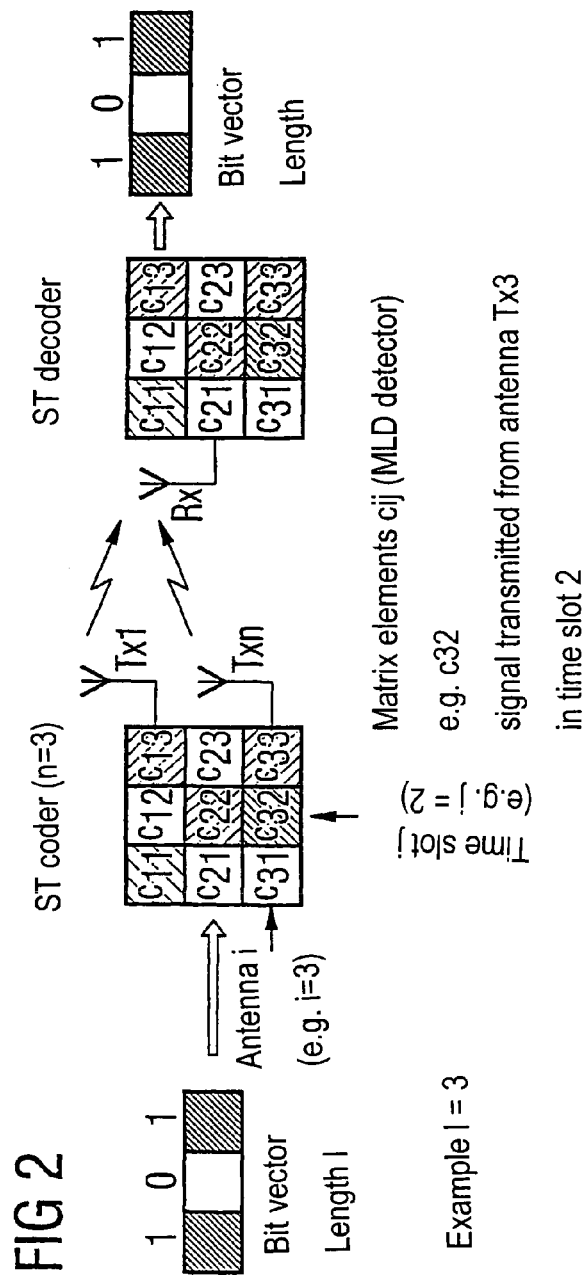
FIG. 2 shows a diagrammatic illustration of a radio transmission link and a corresponding symbol coding and decoding for a space-time block coding known per se in a multi-antenna to single antenna arrangement in a digital mobile radio network.

If a group of code matrices is calculated according to the above equation (7), the result is a list of $2^l$ unitary n×n matrices with complex matrix elements, which can be used as a basis for a non-linear space-time block code, with which a radio transmission link shown diagrammatically in FIG. 2 can be operated in a digital mobile radio network.

In the case of n=3 transmitter antennas and BPSK modulation, i.e., number of transmitter antennas n=length of the symbol words l, for the sake of clarity a specific example of such a list of code matrices $C_k$ is given in the reference table in FIG. 3.

In the reference table shown in FIG. 1 the bits $b_i \in \{0,1\}$ are mapped onto $2^3=8$ bit vectors. These are specifically the eight possible vectors (0,0,0); (0,0,1); (0,1,1); (0,1,0); (1,1,0); (1,1,1); (1,0,1); (1,0,0) formed by permutation.

These eight bit vectors are each uniquely (reversibly uniquely) associated with one of eight code matrices $C_k=C$ (:,:,k). Here the code matrices in table 1 are unitary complex 3×3 code matrices, the matrix elements of which are calculated according to equation (7).

If the association between the eight bit vectors and the eight code matrices $C_k$, shown as an example in FIG. 3, is used for example with a digital mobile radio system as shown in FIG. 2, and a bit vector (1,0,1) for example arrives there at the ST coder, the coder transmits each column of the code matrix $C_7$ in three successive time slots, so that the complex matrix element $c_{117}=0,0000+0.6442i$ is transmitted via the antenna 1 in the time slot 1, the complex matrix element $c_{217}=-0.2175-0.0412i$ via the antenna 2 in the time slot 1, etc. until the complex matrix element $c_{337}=0.0000-0.50651$ is transmitted via the antenna 3 in the time slot 3 (in FIG. 3 i is used for the imaginary unit).

On the receiver side the complete code matrix $C_7$ is then reconstructed from the signals received by a receiver antenna Rx as described above by an MLD detector and the original bit vector (1,0,1) is associated with this again in a reverse mapping.

For practical purposes only the matrices calculated according to equation (7) should be stored with the respective bit vector association in a reference table in the form of the table shown in FIG. 3 in a storage unit of the ST coder on the transmitter side and correspondingly an identical reference table in a receiver-side ST decoder.

The transmitter-side ST coder can be integrated in a base station of a digital mobile radio network and the receiver-side ST decoder in the mobile station of a digital mobile radio network. In principle this can however be reversed.

The reference tables can be stored as computer program products in machine-readable form, for example on diskette or in the form of machine-readable files, which can be transmitted via the internet or the radio transmission links and if necessary can be input into corresponding storage units of transmitter-side ST coders or receiver-side ST decoders in the base stations or mobile stations in a digital mobile radio network.

Real Symbols

For real symbols the characteristic used above for constructive proof resulting in equation (7), that it is always possible to construct a set of unitary matrices, the eigenvalues of which are all different from 1, no longer applies.

Real ST Codes

If we restrict the ST code matrices to real matrix elements $c_{ijk}$, a maximum rank (and therefore a maximum order of diversity of the ST codes) can only be constructed for the case of an even number of antennas.

Theorem 3:

Real ST codes of the order 2n+1 have a non-maximum diversity order.

Proof:

$$\text{Any } O \in SO(2n+1) \text{ can be written as } O = VDV^{-1} \quad (8)$$

(see Simon, Barry: Representations of Finite and Compact Groups, 1996, Graduate Studies in Mathematics, American Mathematical Society, ISBN 0-8218-0453-7), where V is orthogonal and $$D = \begin{pmatrix} \begin{pmatrix} \cos\Phi_1 & -\sin\Phi_1 \\ \sin\Phi_1 & \cos\Phi_1 \end{pmatrix} & & & 0 \\ & \begin{pmatrix} \cos\Phi_2 & -\sin\Phi_2 \\ \sin\Phi_2 & \cos\Phi_2 \end{pmatrix} & & \\ & & \ddots & \\ 0 & & & 1 \end{pmatrix}$$

(For matrices with det O=−1 the proof is essentially identical).

Let us now consider $\det(O_1-O_2)=\det(1-O_2O_1^{-1})=\det(1-O_{2l})$, where due to the group structure $O_{2l} \in SO(2n+1)$ applies. $O_{2l}$ then has the structure according to equation (8) and the determinate $\det(O_l-O_2)$ disappears.

The reason why SO(2n+1) does not provide a maximum diversity order is based on the fact that every orthogonal matrix with an uneven dimension has (at least) one eigenvalue equal to 1.

For an even number of antennas, the additional 1 does not occur at the position (n,n) of D and a code construction similar to the unitary one is possible.

ST Symbol Optimization

Although the theorem for complex ST modulation is constructive, it does not provide an optimal ST code. The asymptomatic symbol error is of the form $$P_e \sim c \left(\frac{E_b}{N_0}\right)^{-n},$$

as a result of which an optimum diversity order occurs for $$\frac{E_b}{N_0}.$$

However the constant c is not minimal.

Practical methods for code construction based on optimization considerations are therefore set out below. The results are confirmed by simulation.

In the sections below, construction methods are set out for "good" unitary ST codes, i.e. those ST codes with which the intervals between the code symbols are optimized.

Optimization

The idea is to find suitable parameterization for a set of unitary U(n) matrices and then to minimize a suitable metric numerically, the metric representing the intervals between the code words. As the distance measurement $D_{ev}=\min\{\text{eigenvalues of } C(\vec{\beta}_i)-C\vec{\beta}_j\}$ cannot be differentiated, we select $$d_{ij} := d(C(\vec{\beta}_i), c(\vec{\beta}_j)) = |\det(C(\vec{\beta}_i)-C(\vec{\beta}_j))|.$$

Here $\vec{\beta}_k$ stands for the parameter of the kth code matrix $C_k$. As a target functional $$E_q[\vec{\beta}_1, \vec{\beta}_2, \ldots] = \left(\sum_{i<j}^{2^l} \left[d(C(\vec{\beta}_i), C(\vec{\beta}_j))\right]\right)^{\frac{1}{q}} \quad (6)$$

for global extremal value creation, we can use the $L_q$ standard of all both-way code intervals. For example, $q \to -\infty$ gives the minimum standard (a large negative q can be used for numerical optimization; the case where q=−1 can be interpreted as electrical potential. In fact due to the compactness of U(n) the problem is comparable to the minimization of the electrical energy from $2^l$ equally charged particles moving on a sphere. Positive values for q are not meaningful, as they exclude no distances which could be zero (i.e. two particles, at the same place, do not generate infinite energy, so they would not repel each other).

The Case of the Group SU(2)

This case corresponds to n=2 antennas.

In this case the energy function described above can be specifically constructed, as according to Simon Barry, "Representation of Finite and Compact Groups", Graduate Studies in Mathematics, Volume 10, American Mathematical Society, every unitary matrix C can be parameterized as $$C = 1\beta_0 + j(\beta_1\sigma_1 + \beta_2\sigma_2 + \beta_3\sigma_3) := \vec{\beta} \cdot \vec{\sigma}$$

where $\vec{\sigma}_i$ are the known Pauli spin matrices:

$$\vec{\sigma}_1\begin{pmatrix} 0 & 1 \\ 1 & 0 \end{pmatrix}, \vec{\sigma}_2\begin{pmatrix} 0 & -j \\ j & 0 \end{pmatrix}, \vec{\sigma}_3\begin{pmatrix} 1 & 0 \\ 0 & -1 \end{pmatrix},$$

and here j is the imaginary unit.

The real parameters β here are subject to the restriction $$\sum_{i=0}^{3} \beta_i^2 = 1.$$

In fact this ensures that SU(2) is isomorphous in relation to a 3-sphere (a sphere with four dimensions). It can easily be shown that $\det(C(\vec{\beta}_i)-C(\vec{\beta}_j))=2-2\vec{\beta}_i \cdot \vec{\beta}_j$, therefore we define $$d_{ij}=\sqrt{1-\vec{\beta}_i \cdot \vec{\beta}_j}$$

as the measure of distance between two code matrices. Note that $d_{ij}$ is actually a metric in the case of SU(2).

We use $d=\sum_{i<j} d_{ij}$ as the full interval. A 3-sphere is parameterized simply by three angles:

$$\vec{\beta}_i = \begin{pmatrix} \sin\Phi_{i3} & \sin\Phi_{i2} & \sin\Phi_{i1} \\ \cos\Phi_{i3} & \sin\Phi_{i2} & \sin\Phi_{i1} \\ & \cos\Phi_{i2} & \sin\Phi_{i1} \\ & & \cos\Phi_{i1} \end{pmatrix}$$

The gradient here is:

$$\frac{\partial}{\partial \Phi_{kl}} d = -\left(\frac{\partial}{\partial \Phi_{kl}} \vec{\beta}_k\right) \cdot \sum_{i \neq k} \frac{\vec{\beta}_i}{d_{ik}}$$

Optimization methods based on that of the steepest descent provide fast results for a reasonable l.

Figure 5:
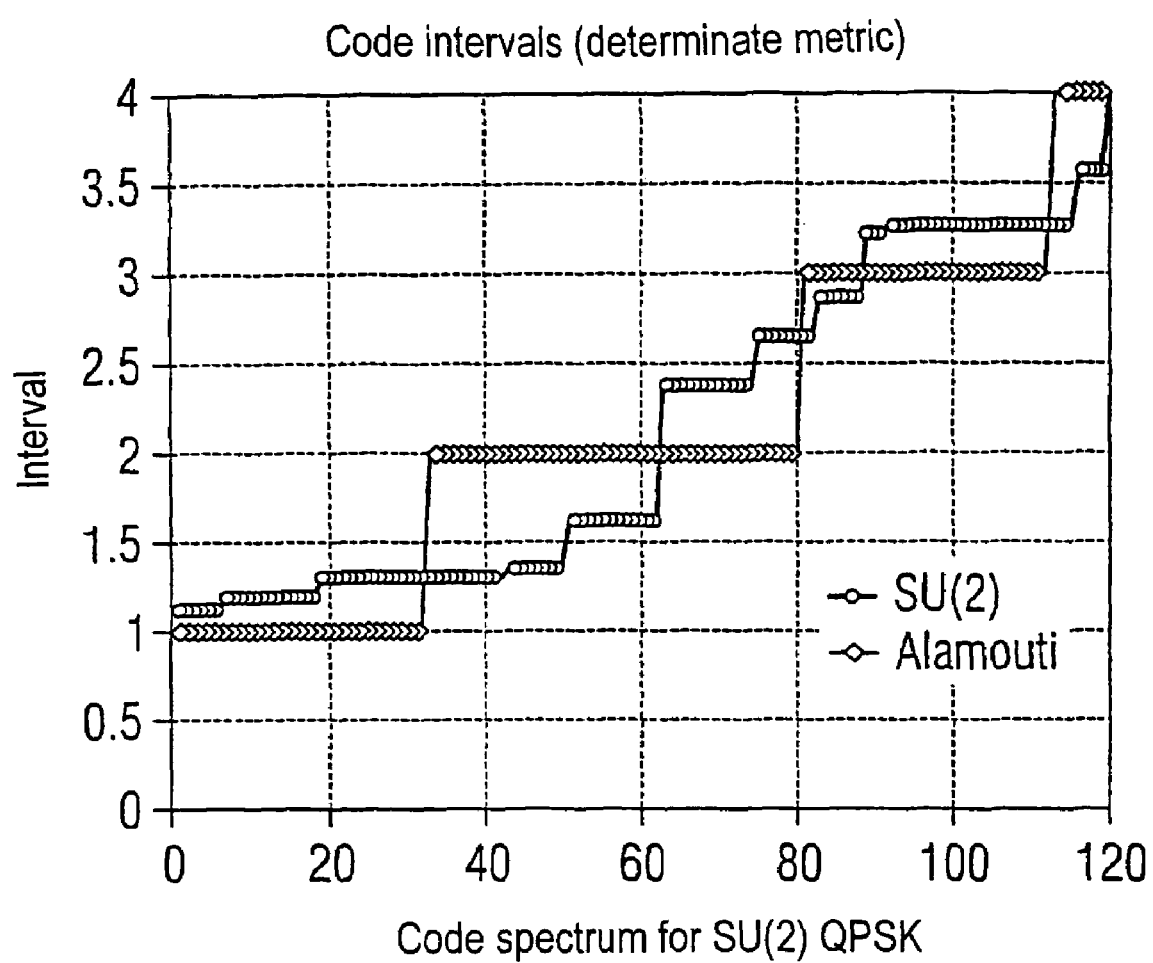
FIG. 5 shows the comparison in the code spectrum for an inventively constructed interval-optimized space-time block code for the case SU(2) in the case of n=2 transmitter antennas and a space-time code constructed according to the known Alamouti scheme, which is not interval-optimized.

The resulting code spectrum for QPSK (l=4) is compared in FIG. 5 with the code spectrum for the Alamouti scheme. As can be seen, the minimum interval with this procedure is greater than with the Alamouti scheme. Therefore in the asymptomatic extreme case it should be anticipated that this non-linear code will show a higher coding gain (same bit error rate for lower signal to noise ratio).

SU(3) and an Implicit Numerical Gradient Method

In cases with more than two transmitter antennas, i.e. SU(n), n>2, the specific calculation of determinants becomes very extensive. For gradient methods (e.g. the conjugate gradient method, see W. Press, B. Flannery, S. Tenolsky, W. Vetterling: "Numerical recipes in C", Cambridge University Press, ISBN 0-521-35465-X) is it however sufficient to calculate the local gradient.

We define the $L_m$ interval of the ith matrix in respect of all others as:

$$d_i^m = \sum_j |\det(C_j - C_i)|^m = \sum_j |\det(1 - C_j^\dagger C_i)|^m := \sum_j |\det(1 - A_{ij})|^m \quad (9)$$

If the ith code matrix is varied by an infinitesimal (unitary) rotation $$C_i \rightarrow C_i \exp(j\vec{\sigma} \cdot \vec{\delta}_i) \approx C_i + j\vec{\delta}_i \cdot C_i \vec{\sigma}$$

the following results for the gradient $$\vec{\nabla}_{\delta_i} d_i^m := \vec{g}_i = n \sum_{j \neq i} |d_{ij}|^n \operatorname{Re} Tr(A_{ij}^{-1} \vec{B}_{ij}) \quad (10)$$

where:

$$\vec{B}_{ij} = -j C_j^\dagger C_i \vec{\sigma}.$$

The $\sigma_i$ here are the corresponding Hermitian standard spin matrices. For larger-dimensional spaces (n>2) these are specified for example in the book "Gauge theory of elementary particle physics" by Ta-Pei Cheng and Ling-Fong Li.

A variation with an increment $\delta$ is then applied to the ith code word according to $$C_i \rightarrow C_i \exp(j\delta \vec{\sigma} \cdot \vec{g}_i) \quad (11)$$

An algorithm with the steepest descent then functions as follows:

Generate a random quantity of $2^l$ unitary n×n matrices $S_k$, k=1 ... $2^l$ as initial matrices (this can also be done according to equation (7)).

Calculate the gradient vectors according to equation (10).

"Rotate" the matrices according to the equation (11), then iterate according to stage 2).

Naturally a conjugate gradient method can be constructed correspondingly and stochastic gradient methods are also possible to find the global extreme value creator.

Figure 6:
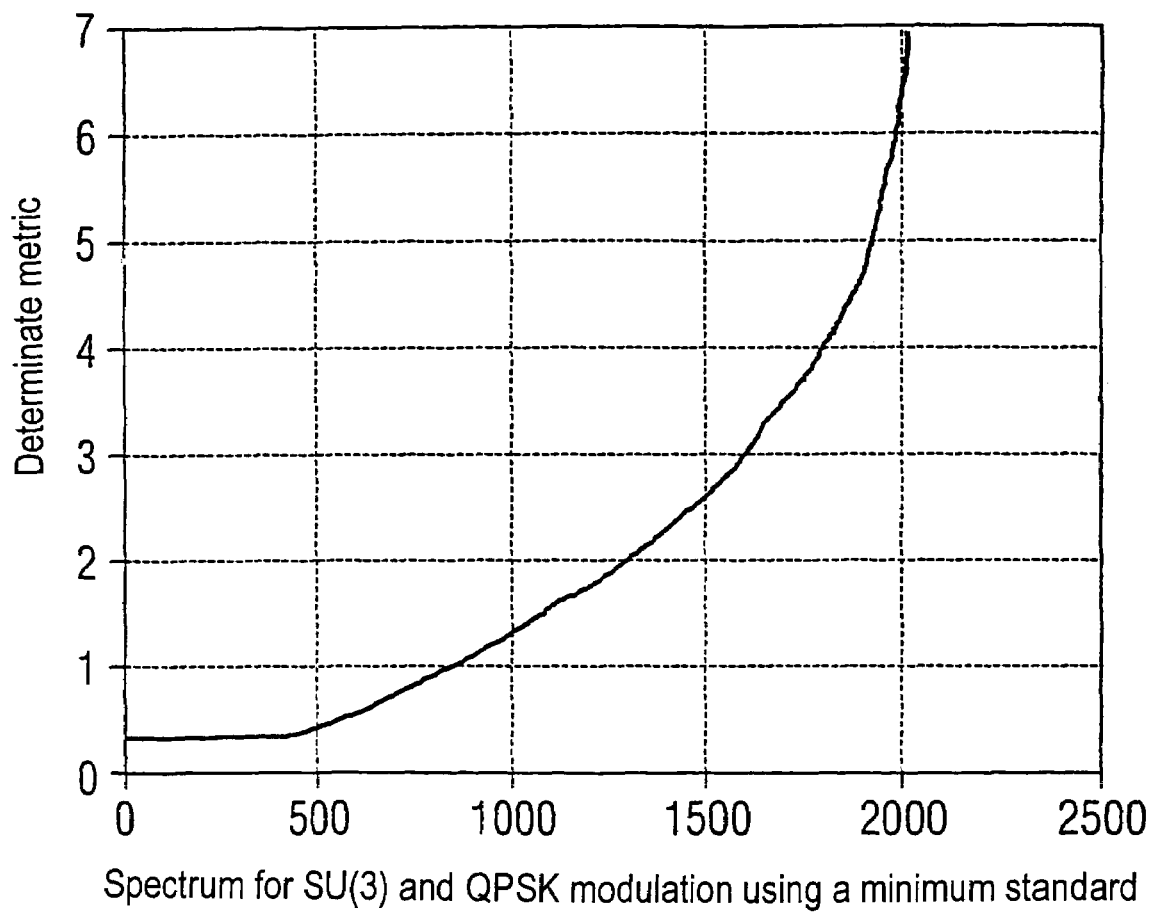
FIG. 6 shows a code spectrum for an inventively constructed interval-optimized space-time code for the case SU(3) in the case of n=3 transmitter antennas and QPSK modulation using a minimum standard.
Figure 7:
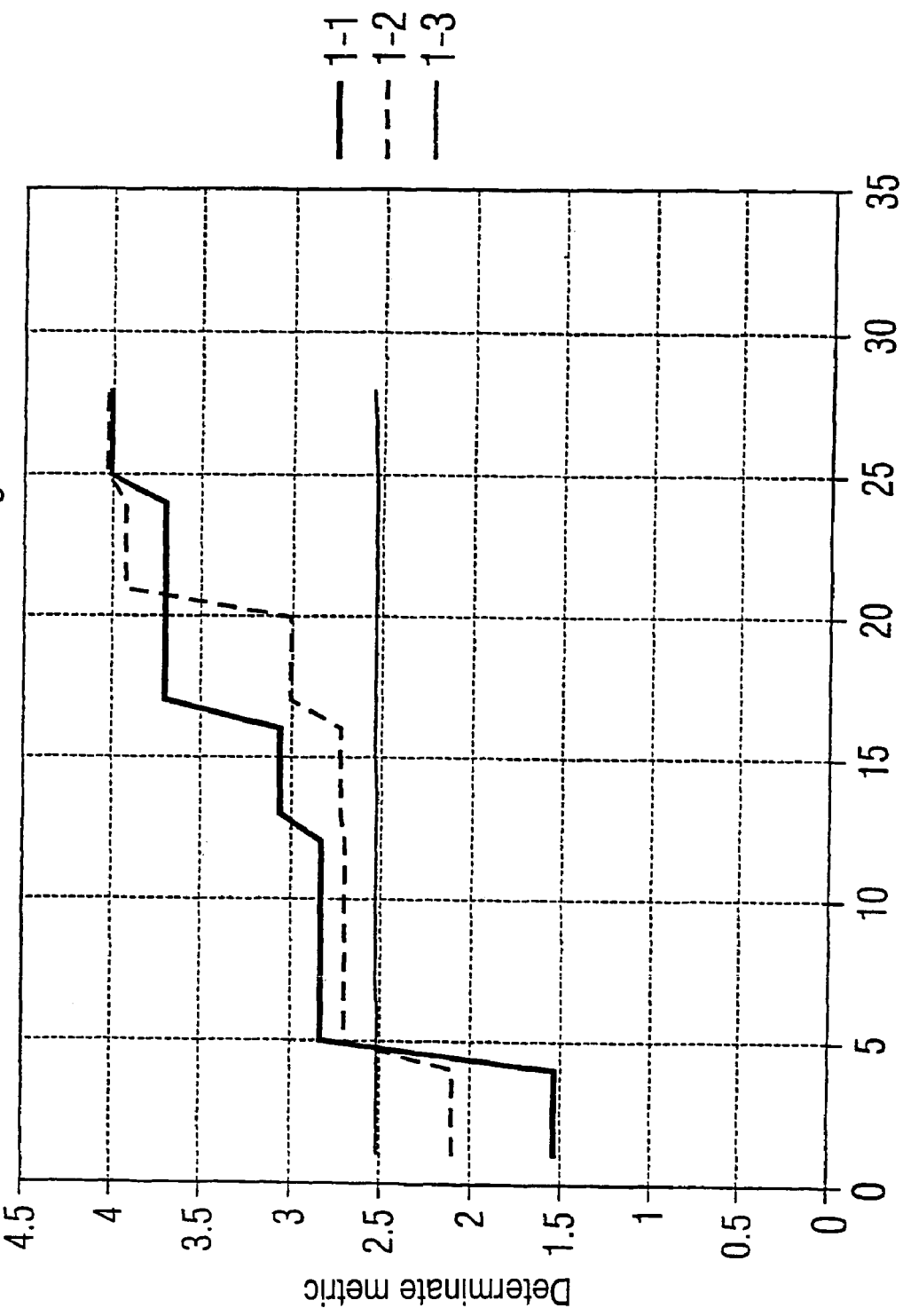
FIG. 7 shows a code spectrum for space-time block codes constructed by inventive numerical optimization methods in the case of n=3 transmitter antennas and BPSK modulation using different standards.

An example of 3 antennas and a QPSK modulation, which provides $2^6=64$ ST matrices, is shown in FIG. 6. FIG. 6 shows a spectrum for SU(3), i.e. three transmitter antennas, and QPSK modulation using a minimum standard. If the same method is used for SU(3) but for a BPSK modulation and using different standards (min, $L_{-1}$, $L_{-2}$), the spectra shown in FIG. 7 are obtained.

It seems to be worthy of note that it is possible to find eight code matrices in SU(3), which all show the same mutual interval. This corresponds to a tetrahedron in the standard three-dimensional space.

Figure 4:
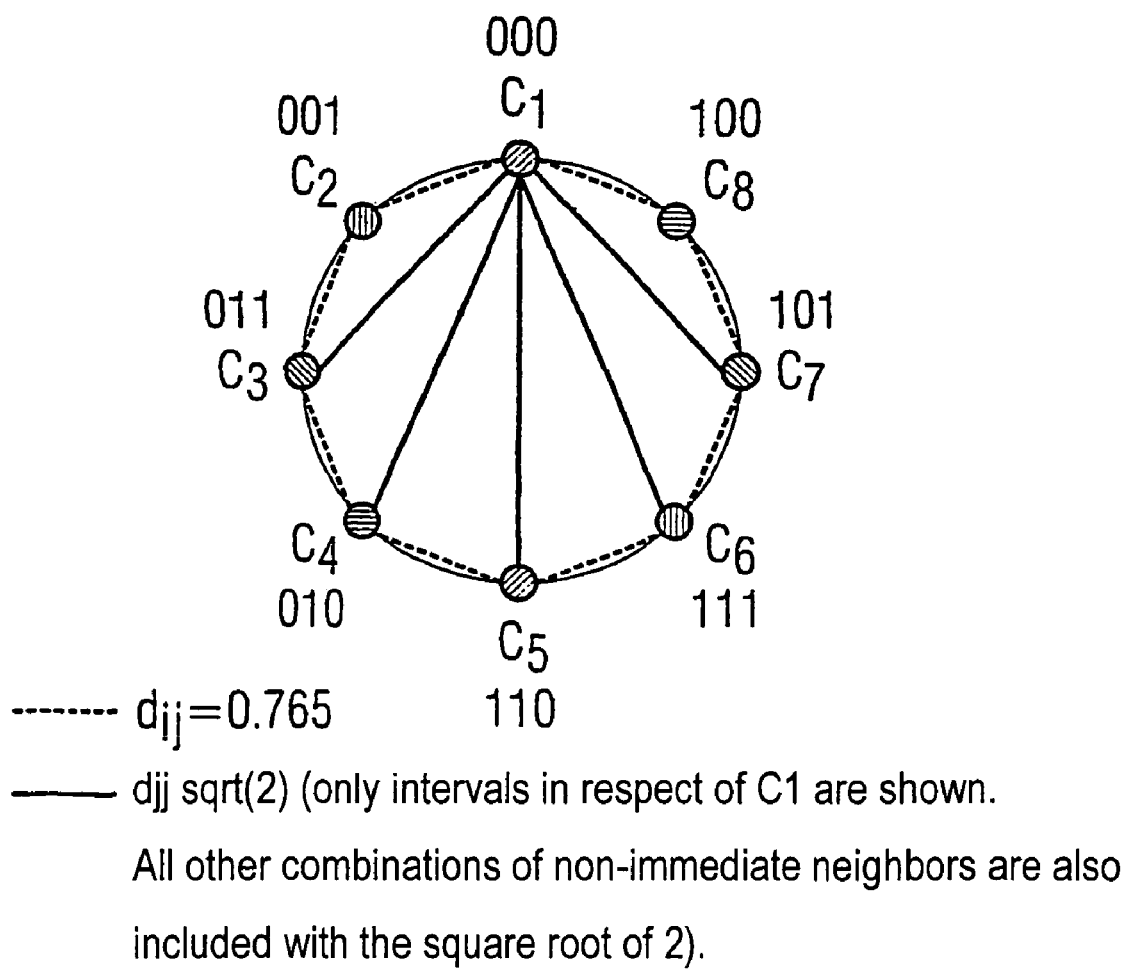
FIG. 4 shows the intervals between eight ST symbols in the case of a space-time block coding discussed in relation to FIG. 3.

FIG. 4 shows a two-dimensional illustration of this. The eight bit vectors (0,0,0); (0,0,1); (0,1,1); (0,1,0); (1,1,0); (1,1,1); (1,0,1); (1,0,0) are mapped onto eight code matrices (e.g. the code matrices specifically set out in FIG. 3), which have optimum intervals in respect of each other.

Figure 8:
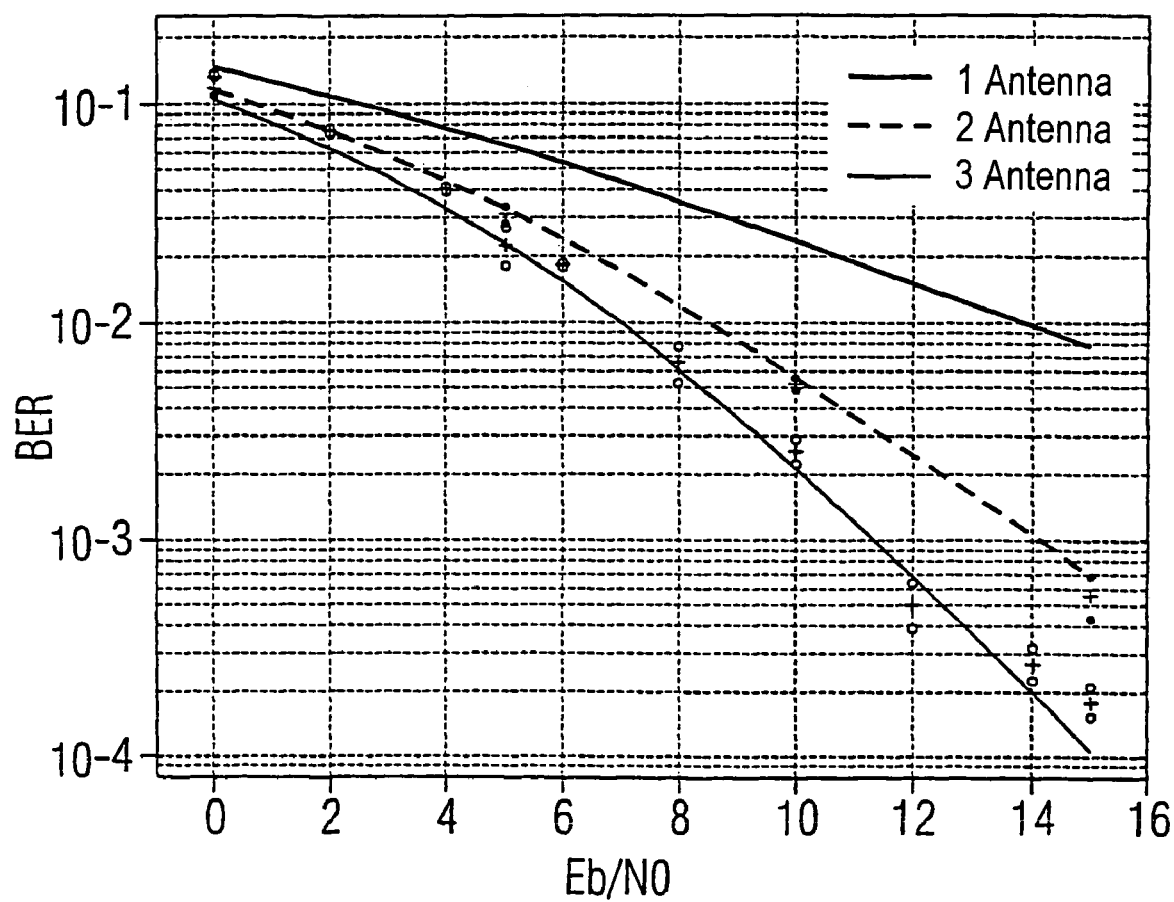
FIG. 8 shows a BPSK simulation for two and three antennas using an $L_{min}$ code.

FIG. 8 shows a spectrum for n=3 antennas and BPSK using different optimization criteria.

In addition to the numerical optimization method described above, there are further approaches for code optimization, i.e. the specific construction of ST symbols in the form of unitary n×n matrices with optimized intervals in respect of each other:

Construction of Hyperspheres:

Let a (hyper) sphere with a defined radius be constructed around a defined code symbol (e.g., a unitary n×n matrix $C_k$), a second code symbol be found on the sphere around this first code symbol and a third symbol be constructed as the point of intersection of the (hyper) spheres and the first and second code symbol. Then let further code symbols be constructed correspondingly and iteratively as the points of intersection of further (hyper) spheres around the code words already found in each instance.

In the event that the code words are unitary n×n matrices with n≧2, a "sphere" with radius r around a code word is defined by $S_r\{C'|\det(C'-C)=r\}$.

It can be constructed by $$r = \det(C - C') = \det(1 - C_1^\dagger C') = \det(1 - \exp(j\vec{\sigma}\vec{\beta})) = \prod_{i=1}^n (1 - \exp(\lambda_i)),$$

where $\lambda_l$ are the eigenvalues of $j\vec{\sigma}\vec{\beta}$,

For example it is found in SU(2) that $$r = 4\sin^2(1/2\sqrt{\beta_1^2 + \beta_2^2 + \beta_3^2}).$$

This means that such a sphere can be parameterized as $C' = C\exp(j\vec{\sigma}\vec{\beta})$ with restriction of the sum of the squared βs.

A sphere with radius 1 is for example defined by $$S_1(C) = \{C\exp(j\vec{\sigma}\vec{\beta})|\beta_1^2 + \beta_1^2 + \beta_1^2 = \pi^2/9, -\pi/3 \leq \beta_i \leq \pi/3\}.$$

Using this idea, it is actually possible to construct the Alamouti scheme (by constructing two spheres with the radius 1 around the elements 1 and −1 (the center of SU(2), . . . Z(SU(2)).

This gives the following formula for the code words:

$$C = \exp\left(j\frac{\pi}{3\sqrt{3}}(1+b_0)\sum_{i=1}^{3}(1-2b_i)\sigma_i\right),$$

where $b_i \in \{0,1\}$ are the bits and $\sigma_I$ the Hermitian standard spin matrices.

Specific calculation leads back to the already known Alamouti scheme, thereby proving the correctness of the approach of construction hyperspheres.

As the example of the Alamouti scheme in conjunction with FIG. 5 shows, a local optimum can be found using the hypersphere method but not necessarily a global optimum.

Nevertheless, for n>2 the eigenvalues of $j\vec{\sigma}\vec{\beta}$ are (analytically) very extensive.

Therefore a different parameterization seems more successful here for n>2:

$$r = \det(1 - C^\dagger C) = \det(1 - VDV^\dagger) = \det(1 - D) = \Pi_i(1 - \exp(j\lambda_i))$$

If the eigenvalues $\lambda_i$ are kept constant, the result is a sphere around the code symbol C with $$C' = CVDV^\dagger.$$

V can be parameterized here as $V = \exp(j\vec{\rho}\vec{\beta})$.

Unitary Representations of Finite Groups

A further method of code construction is based on the use of finite groups. For this, see also Simon Barry, "Representation of Finite and Compact Groups", Graduate Studies in Mathematics, Volume 10, American Mathematical Society.

The combination of two elements in a finite group leads back to one element of the group, as the group is closed after a group axiom. Also the multiplication of two unitary matrices again provides a unitary matrix. There are correspondingly numerous representations of finite groups, in which a unitary matrix is associated with each group element. If such a representation of a finite group, in which the number of group elements is greater than $2^l$, is selected, good initial values are obtained for the optimization methods referred to above.

For this, it is necessary to try to find the unitary representations of finite groups (with the dimension n), in which $o(G) \geqq 2^l$. There is no guarantee that this produces optimum results.

Figure 9:
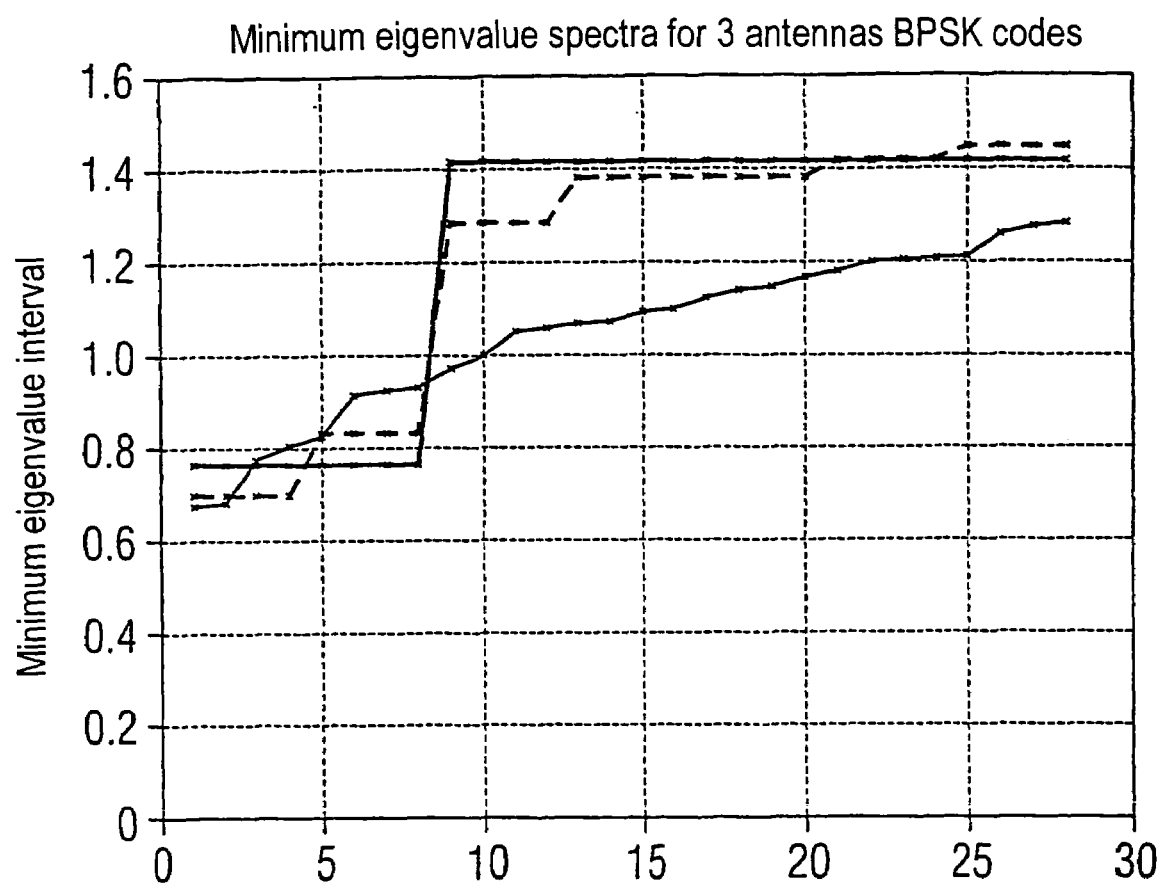
FIG. 9 shows the spectrum of minimum eigenvalues with different inventive codes for n=3 transmitter antennas and BPSK modulation.

Some Simulation Results:

Simulations are carried out for the instances with n=2 and n=3 antennas, in which only BPSK has (currently) been used. Theoretical limits for antenna diversity can be derived in closed form (see also for example J. Proakis, M. Salehi: "Communications Systems Engineering", Prentice Hall Int., ISBN 0-13-300625-5, 1994). These can be seen as continuous lines in FIG. 9. Simulation results are shown together with 70% confidence intervals.

As shown in FIG. 10, the theoretical limit for high $E_b/N_0$ in the case of three antennas is reached for the $L_{min}$ code. This is due to the fact that $L_{min}$ is actually the maximum possible smallest interval.

For a good signal to noise ratio in practice only the errors at the smallest intervals make a contribution.

However with a low signal to noise ratio the characteristics of the code deteriorate and they can even be worse than with a diversity of two antennas. In fact ST codes can be seen as a higher modulation scheme (resulting in expansion of the symbol space). It is of course not possible to increase the number of symbols without reducing the intervals in a compact space. This problem becomes even more significant for QPSK (with 64 ST symbols).

For the $L_1$ code performance is better in the areas with a low signal to noise ratio. Gray coding was used for this code (which has two different intervals in the minimum eigenvalue standard), in order to avoid multiple bit errors in the event of a symbol error. As can be seen in the spectrum below, each code matrix has precisely two immediate neighbors. All other code words have a larger interval. As can be seen, the code is close to the theoretical limit for $E_b/N_0 > 4$ dB and it outperforms the $L_{min}$ code in the area with low $E_b/N_0$.

The invention has been described in detail with particular reference to preferred embodiments thereof and examples, but it will be understood that variations and modifications can be effected within the spirit and scope of the invention.

The invention claimed is:

1. A method for operating a digital mobile radio network with orthogonally structured space-time block transmission codes with maximum diversity n×m for a transmitting station having n transmitter antennas and a receiving station having m receiver antennas, where m and n are each an integer greater than or equal to 2, comprising:

transmitting a set of $2^l$ data bit vectors $\vec{b} = (b_1, b_2, \ldots b^l) \in B^l$ with l bits $b_i \in \{0,1\}$ from the transmitting station, the data bit vectors $\vec{b}$ being mapped by a one-to-one mapping $$STM: \quad B^l \to U(n)$$
$$\vec{b} \to C(\vec{b})$$

onto a set of $2^l$ space-time code symbols $C_k$, k=0, 2, . . . , $2^l - 1$, with each space-time code symbol $C_k$ corresponding to a unitary n×n matrix;

interpreting matrix elements $c_{ijk}$, i=1, . . . n, of each of the $2^l$ space-time code symbols $C_k$ as space-time variables so that:

the matrix elements $c_{ijk}$ have corresponding signals transmitted by the n transmitter antennas, and on transmission of one of the $2^l$ code symbols $C_k$, a corresponding signal is transmitted for each of the matrix elements $c_{ijk}$, the corresponding signal being transmitted from a transmitter antenna i of the n transmitter antennas, in a time interval j via a fading channel associated with the transmitter antenna i;

receiving signals transmitted in the time interval j corresponding to the matrix elements $c_{ijk}$ of the code symbol $C_k$ at each of the m receiver antennas of the receiving station within range of the transmitting station;

decoding a corresponding data bit vector $\vec{b} \in B^l$ to be transmitted, by:

performing a reverse mapping $$STM^{-1}: \quad U(n) \to B^l$$
$$C(\vec{b}) \to \vec{b}$$

due to an orthogonal structure of a transmission code formed by the space-time symbols $C_k$, and decoupling the signals transmitted by the n transmitter antennas and the corresponding matrix elements $c_{ijk}$; and constructing the matrix elements $c_{ijk}$ of the space-time symbols $C_k$ as the elements of $2^l$ unitary n×n matrices according to the following specification:

$$C_k = \begin{pmatrix} c_{11k} & & c_{1nk} \\ & \cdots & \\ c_{n1k} & & c_{nnk} \end{pmatrix} = V \begin{pmatrix} \exp\left(\frac{2\pi j}{2^l} q_1 k\right) & & 0 \\ & \cdots & \\ 0 & & \exp\frac{2\pi j}{2^l} q_1 k \end{pmatrix} V^{-1}$$

where

V is any unitary complex n×n matrix, $c_{ijk}$ are the generally complex matrix elements of the space-time symbol $C_k$, j is an imaginary unit, $q_i$, where i=1, ..., n, is any odd whole number, and k=0, 1, ..., $2^l-1$.

2. The method according to claim 1, wherein n is even and $c_{ijk}$ are real.

3. A method for operating a digital mobile radio network with orthogonally structured space-time block transmission codes with maximum diversity n×m for a transmitting station having n transmitter antennas and a receiving station having m receiver antennas, where m and n are each an integer greater than or equal to 2, comprising:

transmitting a set of $2^l$ data bit vectors $b=(b_1, b_2, \ldots b_l) \in B^l$ with l bits $b_i \in \{0,1\}$ from the transmitting station, the data bit vectors b being mapped by a one-to-one mapping $$STM: \quad B^l \to U(n)$$
$$\vec{b} \to C(\vec{b})$$

onto a set of $2^l$ space-time code symbols $C_k$, k=0, 2, ..., $2^l-1$, with each space-time code symbol $C_k$ corresponding to a unitary n×n matrix;

interpreting matrix elements $c_{ijk}$, i=1, ... n, of each of the $2^l$ space-time code symbols $C_k$ as space-time variables so that:

the matrix elements $c_{ijk}$ have corresponding signals transmitted by the n transmitter antennas, and on transmission of one of the $2^l$ code symbols $C_k$, a corresponding signal is transmitted for each of the matrix elements $c_{ijk}$, the corresponding signal being transmitted from a transmitter antenna i of the n transmitter antennas, in a time interval j via a fading channel associated with the transmitter antenna i;

receiving signals transmitted in the time interval j corresponding to the matrix elements $c_{ijk}$ of the code symbol $C_k$ at each of the m receiver antennas of the receiving station within range of the transmitting station;

decoding a corresponding data bit vector $\vec{b} \in B^l$ to be transmitted, by:

performing a reverse mapping $$SMT^{-1}: \quad U(n) \to B^l$$
$$C(\vec{b}) \to \vec{b}$$

due to an orthogonal structure of a transmission code formed by the space-time symbols $C_k$, and decoupling the signals transmitted by the n transmitter antennas and the corresponding matrix elements $c_{ijk}$; and optimizing the matrix elements $c_{ijk}$ corresponding to the signals to be transmitted as elements of $2^l$ unitary n×n matrices $C_k$, k=0, 2, ..., $2^l-1$, the matrix elements $c_{ijk}$ being optimized numerically according a specification comprising:

a) an initial set of $2^l$ unitary n×n initial matrices $S_k$, k=0, 2, ..., $2^l-1$ are generated numerically at random, b) the initial matrices $S_k$, k=0, 2, ..., $2^l-1$ are parameterized so that each of the initial matrices has parameters, c) a variable $d_{ij}:=d(S(\vec{\beta}_i), S(\vec{\beta}_j))=|\det(S(\vec{\beta}_i)-S(\vec{\beta}_j))|$ is selected as a measure of distance between two initial matrices $S_k$, with $\vec{\beta}_i$ representing the parameters of the ith initial matrix, d) a target functional $$E_q[\vec{\beta}_1, \vec{\beta}_2, \cdots] = \left(\sum_{i<j}^{2^l} [d(S(\vec{\beta}_i), S(\vec{\beta}_j))]\right)^{\frac{1}{q}}$$

is minimized by numerical variation of $\vec{\beta}_i$, and e) the n×n initial matrices, for which $\vec{\beta}_i$ was numerically varied to minimize the target functional, are selected as final n×n matrices, which correspond in each instance to a space-time symbol $C_k$, the matrix elements of the final n×n matrices being selected as the matrix elements $c_{ijk}$ corresponding to the signals to be transmitted.

4. The method according to claim 3, wherein a) n=2, b) every matrix of the initial set of 2' unitary n×n initial matrices $S_k$ is parameterized as $$S = 1\beta_0 + i(\beta_1\sigma_1 + \beta_2\sigma_2 + \beta_3\sigma_3) = \vec{\beta} \cdot \vec{\sigma}$$

where the following applies for $\sigma_i$:

$$\sigma_1 \begin{pmatrix} 0 & 1 \\ 1 & 0 \end{pmatrix}, \sigma_2 \begin{pmatrix} 0 & -j \\ j & 0 \end{pmatrix}, \sigma_3 \begin{pmatrix} 1 & 0 \\ 0 & -1 \end{pmatrix},$$

j is the imaginary unit, and the real parameters β are subject to the following restriction:

$$\sum_{i=0}^{3} \beta_i^2 = 1,$$

$$d_{ij} = \sqrt{1 - \vec{\beta}_i \cdot \sqrt{\vec{\beta}_j}} \qquad c)$$

is selected as the measure of distance between two matrices $A_i$, $A_j$, d1) $\vec{\beta}_i$ are parameter vectors, which are parameterized as $$\vec{\beta}_i = \begin{pmatrix} \sin\Phi_{i3} & \sin\Phi_{i2} & \sin\Phi_{i1} \\ \cos\Phi_{i3} & \sin\Phi_{i2} & \sin\Phi_{i1} \\ & \cos\Phi_{i2} & \sin\Phi_{i1} \\ & & \cos\Phi_{i1} \end{pmatrix},$$

d2) the gradients $$\frac{\partial}{\partial \Phi_{kl}} d = -\left(\frac{\partial}{\partial \Phi_{kl}} \vec{\beta}_k\right) \cdot \sum_{i \neq k} \frac{\vec{\beta}_i}{d_{ik}}$$

are minimized numerically for all n×n initial matrices by iteration, and e) the n×n initial matrices corresponding to the gradients that were minimized are selected as final n×n matrices.

5. The method according to claim 3, wherein
an $L_m$ interval of the ith initial matrix in respect of all others is defined as:

$$d_i^m = \sum_j |det(S_j - S_i)|^m = \sum_j |det(1 - S_j^\dagger S_i)|^m := \sum_j |det(1 - A_{ij})|^m,$$

gradients $$\vec{\nabla}_{\delta i} d_i^m := \vec{g}_i = n \sum_{j \neq i} |d_{ij}|^n \text{Re} \, Tr(A_{ij}^{-1} \vec{B}_{ij})$$

are calculated, with $\vec{\beta}_{ij} = -jS_j^\dagger S_i \vec{\sigma}$ and $\sigma_i$ representing corresponding Hermitian standard spin matrices,
the ith initial matrix $S_i$ is varied by an infinitesimal (unitary) rotation $$S_i \to S_i \exp(j\vec{\sigma} \cdot \vec{\delta}_i) \approx S_i + j\vec{\delta}_i \cdot S_i \vec{\sigma}, \text{ and}$$

the gradients $$\vec{\nabla}_{\delta i} d_i^m := \vec{g}_i = n \sum_{j \neq i} |d_{ij}|^n \text{Re} \, Tr(A_{ij}^{-1} \vec{B}_{ij})$$

are calculated by iterative calculation, until they are minimized.

6. The method according to claim 3, wherein the initial matrices $S_k$ are calculated according to the following specification:

$$S_k = \begin{pmatrix} s_{11k} & & s_{1nk} \\ & \cdots & \\ s_{n1k} & & s_{nnk} \end{pmatrix} = V \begin{pmatrix} \exp\left(\frac{2\pi j}{2^l} q_1 k\right) & & 0 \\ & \cdots & \\ 0 & & \exp\frac{2\pi j}{2^l} q_1 k \end{pmatrix} V^{-1}$$

where

V is any unitary complex n×n matrix,
J is the imaginary unit,
$S_{ijk}$ are the generally complex matrix elements of $S_k$, where i=1, ..., n is any odd whole number, and
$q_i$, where i=1, ..., n is any odd whole number, and
k=0, 1, ..., $2^l-1$.

7. The method according to claim 3, wherein a finite group G with dimension n and order $o(G) \geq 2^l$ is mapped onto unitary n×n matrices, which are used as initial matrices $S_k$.

8. A method for operating a digital mobile radio network with orthogonally structured space-time block transmission codes with maximum diversity n×m for a transmitting station having n transmitter antennas and a receiving station having m receiver antennas, where m and n are each an integer greater than or equal to 2, comprising:

transmitting a set of $2^l$ data bit vectors $b=(b_1, b_2, \ldots b_l) \in B^l$ with l bits $b_i \in \{0,1\}$ from the transmitting station, the data bit vectors b being mapped by a one-to-one mapping $$STM: B^l \to U(n)$$
$$\vec{b} \to C(\vec{b})$$

onto a set of $2^l$ space-time code symbols $C_k$, k=0, 2, ..., $2^l-1$, with each space-time code symbol $C_k$ corresponding to a unitary n×n matrix;

interpreting matrix elements $c_{ijk}$, i=1, ... n, of each of the $2^l$ space-time code symbols $C_k$ as space-time variables so that:
 the matrix elements $c_{ijk}$ have corresponding signals transmitted by the n transmitter antennas, and
 on transmission of one of the $2^l$ code symbols $C_k$, a corresponding signal is transmitted for each of the matrix elements $c_{ijk}$, the corresponding signal being transmitted from a transmitter antenna i of the n transmitter antennas, in a time interval j via a fading channel associated with the transmitter antenna i;

receiving signals transmitted in the time interval j corresponding to the matrix elements $c_{ijk}$ of the code symbol $C_k$ at each of the m receiver antennas of the receiving station within range of the transmitting station;

decoding a corresponding data bit vector $\vec{b} \in B^l$ to be transmitted, by:
 performing a reverse mapping $$SMT^{-1}: U(n) \to B^l$$
$$C(\vec{b}) \to \vec{b}$$

due to an orthogonal structure of a transmission code formed by the space-time symbols $C_k$, and
decoupling the signals transmitted by the n transmitter antennas and the corresponding matrix elements $c_{ijk}$; and
constructing the matrix elements $c_{ijk}$ of the space-time symbols $C_k$ as the elements of $2^l$ unitary n×n matrices according to the following specification:
 a) a first hypersphere with a radius r is constructed numerically around any first code symbol $C_1$ of the code symbols $C_k$, so that a quantity of all code symbols $C_k$ is determined, the first hypersphere following hypersphere properties comprising:

$S_r = \{C' | det(C' - C_i) = r\}$, which results from calculating $$r = det(C - C') = det(1 - C_1^A C') = det(1 - \exp(j\vec{\sigma}\vec{\beta})) = \prod_{i=1}^{n}(1 - \exp(\lambda_i)),$$

where $\lambda_i$ are eigenvalues of $j\vec{\sigma}\vec{\beta}$, b) on the first hypersphere, a second code symbol $C_2$ of the code symbols $C_k$ is selected, around which a second hypersphere is constructed following the hypersphere properties, and c) a further code symbol $C_3$ is produced at a point of intersection of the first and second hyperspheres around the code symbols $C_1$, $C_2$, and d) further hyperspheres are iteratively constructed around the further code symbol following the hypershere properties around the further code symbol following the hypersphere properties, until a full set of $2^l$ code symbols $C_k$ is constructed and represented in each instance by a unitary n×n matrix.

9. A base station, comprising:
a storage unit, containing an association table, wherein
the association stores an association of individual bit vectors with space-time code symbols, and
the association table is in the form of a matrix that contains the matrix elements $c_{ijk}$ association of individual bit vectors with space-time symbols association matrix elements $c_{ijk}$ used in one of the methods according to any claims 1-8.

10. A mobile station, comprising:
a storage unit, containing an association table, wherein
the association stores an association of individual bit vectors with space-time code symbols, and
the association table is in the form of a matrix that contains the matrix elements $c_{ijk}$ association of individual bit vectors with space-time symbols association matrix elements $c_{ijk}$ used in one of the methods according to any claims 1-8.

11. A computer readable storage medium storing a program to control a processor to perform a method for operating a digital mobile radio network with orthogonally structured space-time block transmission codes with maximum diversity n×m for a transmitting station having n transmitter antennas and a receiving station having m receiver antennas, where m and n are each an integer greater than or equal to 2, comprising:

transmitting a set of 2 data bit vectors $\vec{b} = (b_1, b_2, \ldots b_l)$ E $B^l$ with l bits $b_i \epsilon \{0,1\}$ from the transmitting station, the data bit vectors b being mapped by a one-to-one mapping $$STM: B^l \rightarrow U(n)$$
$$\vec{b} \rightarrow C(\vec{b})$$

onto a set of $2^l$ space-time code symbols $C_k$, k=0, 2, ..., $2^l-1$, with each space-time code symbol $C_k$ corresponding to a unitary n×n matrix;

interpreting matrix elements $c_{ijk}$, i=1, ... n, of each of the $2^l$ space-time code symbols $C_k$ as space-time variables so that:
the matrix elements $c_{ijk}$ have corresponding signals transmitted by the n transmitter antennas, and
on transmission of one of the $2^l$ code symbols $C_k$, a corresponding signal is transmitted for each of the matrix elements $c_{ijk}$, the corresponding signal being transmitted from a transmitter antenna i of the n transmitter antennas, in a time interval j via a fading channel associated with the transmitter antenna i;

receiving signals transmitted in the time interval j corresponding to the matrix elements $c_{ijk}$ of the code symbol $C_k$ at each of the m receiver antennas of the receiving station within range of the transmitting station;

decoding a corresponding data bit vector $\vec{b} \epsilon B^l$ to be transmitted, by:
performing a reverse mapping $$SMT^{-1}: U(n) \rightarrow B^l$$
$$C(\vec{b}) \rightarrow \vec{b}$$

due to an orthogonal structure of a transmission code formed by the space-time symbols $C_k$, and decoupling the signals transmitted by the n transmitter antennas and the corresponding matrix elements $c_{ijk}$; and constructing the matrix elements $c_{ijk}$ of the space-time symbols $C_k$ as the elements of $2^l$ unitary n×n matrices according to the following specification:

$$C_k = \begin{pmatrix} c_{11k} & & c_{1nk} \\ & \cdots & \\ c_{n1k} & & c_{nnk} \end{pmatrix} = V \begin{pmatrix} \exp\left(\frac{2\pi j}{2^l} q_1 k\right) & & 0 \\ & \cdots & \\ 0 & & \exp\frac{2\pi j}{2^l} q_1 k \end{pmatrix} V^{-1}$$

where
V is any unitary complex n×n matrix,
$c_{ijk}$ are the generally complex matrix elements of the space-time symbol $C_k$,
j is an imaginary unit,
$q_i$, where i=1, ..., n, is any odd whole number, and
k=0, 1, ..., $2^l-1$.

* * * * *